United States Patent [19]

Ranik, Jr.

[11] 4,203,481

[45] May 20, 1980

[54] PNEUMATIC TIRE, RIM AND COMBINATION THEREOF

[75] Inventor: William J. Ranik, Jr., Akron, Ohio

[73] Assignee: The Firestone Tire & Rubber Company, Akron, Ohio

[21] Appl. No.: 968,542

[22] Filed: Dec. 11, 1978

[51] Int. Cl.$^2$ .............................................. B60C 17/00
[52] U.S. Cl. .......................... 152/330 RF; 152/352 A; 152/353 R; 152/375; 152/386; 156/123 A; 301/39 T; 301/97
[58] Field of Search ............... 156/123 A; 152/209 A, 152/330 R, 330 RF, 330 L, 352 A, 354 R, 353 C; 301/39 C, 39 T, 95–98; 152/375, 380, 381, 384, 386

[56] References Cited

U.S. PATENT DOCUMENTS

| | | | |
|---|---|---|---|
| 1,128,455 | 2/1915 | Keith | 301/39 UX |
| 1,253,856 | 1/1918 | Marquette | 301/39 UX |
| 2,367,825 | 1/1945 | Shaw | 301/39 |
| 2,482,221 | 9/1949 | Sokolik | 152/310 |
| 3,765,468 | 10/1973 | Verdier | 152/352 |
| 3,851,691 | 12/1974 | French | 152/353 |
| 3,911,987 | 10/1975 | Takusagawa | 152/354 |
| 3,916,968 | 11/1975 | Masson | 152/353 |
| 3,930,527 | 1/1976 | French | 152/330 RF |
| 3,949,798 | 4/1976 | Gardner | 152/330 RF |
| 3,954,131 | 5/1976 | Hoshino et al. | 152/354 |
| 3,983,919 | 10/1976 | Messerly | 152/357 R |

FOREIGN PATENT DOCUMENTS

| | | |
|---|---|---|
| 2257444 | 10/1973 | France . |
| 1359463 | 7/1974 | United Kingdom . |
| 1390024 | 4/1975 | United Kingdom . |

*Primary Examiner*—John E. Kittle

[57] ABSTRACT

This disclosure relates to a tire, a rim and a combination thereof that yields improved stability characteristics when the tire is run flat. The combination of this invention yields a structure wherein the tire will operate normally under normal conditions of load and pressure and will operate with the load equally distributed on each sidewall of the tire during run flat operation. In this invention, the tire has an asymmetric sidewall construction resulting from the inclusion of rubber inserts in its sidewalls of different bulk and the rim has axially outward extending rim flange extensions which are angled in relation to the axis of rotation of the rim. The extensions are angled in opposite directions. The proper combination of these features compensates for the camber that the tire is subjected to when it is run flat.

17 Claims, 2 Drawing Figures

PNEUMATIC TIRE, RIM AND COMBINATION THEREOF

SUMMARY OF THE PRIOR ART

This invention relates to a tire, a rim and a combination thereof with improved capabilities when the tire is run flat. The run flat capability of an automobile tire, particularly a passenger vehicle tire, has been investigated for many years. Emphasis on the run flat capability of a passenger car tire has increased in recent years due to the desire by automobile manufacturers to eliminate the spare tire in a passenger automobile.

This renewed emphasis on the run flat characteristic of a pneumatic tire has resulted in many structures designed to improve this characteristic. The goal of automobile manufacturers, and therefore tire manufacturers, is to obtain a tire which will maintain automobile stability and tire integrity after the vehicle is run as much as 50 miles at 50 miles per hour with the tire deflated (run flat).

One line of teaching has been to include an insert in the sidewall area of the tire to prevent the tire from flexing or folding over upon itself when it is run flat. Examples of this teaching are given in U.S. Pat. No. 3,949,798, U.S. Pat. No. 3,954,131 and French publication no. 2,257,444. None of the teachings identified above discloses the concept of an asymmetric sidewall insert instruction designed to offset the camber to which a tire is subjected when it is run flat.

The use of an axially outward extending portion on a rim flange has also been taught; see U.S. Pat. No. 2,367,825. This feature has been employed in recent tire-rim combinations designed to have run flat capabilities; for example, see U.S. Pat. No. 3,930,527, English Pat. No. 1,359,463 and English Pat. No. 1,390,024. Again, none of these teachings disclose a consideration of the angulation caused by the camber in a vehicle tire when the tire is operated in a run flat condition on the vehicle.

It is an object of this invention to provide an improvement in a pneumatic tire, a rim and a combination thereof that results in the equal distribution of the vehicle load on the tire when the tire is run flat. This eliminates the uneven load that has occurred in the past with standard tire and rim constructions or other tire and rim constructions designed specifically for run flat capabilities, as both of these constructions did not take into account the camber to which a tire is subjected when it is mounted on a vehicle and is run flat. In a run flat situation, then uneven load in the sidewalls (the load imbalance) is exaggerated and such tires are more sensitive to this load imbalance.

In passenger vehicles the tire on the front positions may be subjected to an initial camber of, on an average, from approximately positive 0.5° to +2° and the rear tires to an initial camber of approximately +0.5°. This initial camber setting is designed by the vehicle manufacturer for the best compromise of all around vehicle performance with handling being of ultimate importance and given the maximum consideration. This initial, front position camber is accentuated in the run flat configuration. It increases to angles up to 4° and higher. The initial rear position camber also increases on run flat operation. A further object of this invention is to compensate for this accentuated camber that occurs on front position wheels, and on rear position wheels, during the run flat operation of the tire.

A further object of this invention is to improve the run flat capabilities of a tire or a tire and rim combination by including features in the combination which compensate for the camber imparted to the tire and combination when the tire is run flat when it is mounted on a vehicle either with or without an initial camber.

SUMMARY OF THE INVENTION

The tire, rim and combination thereof that incorporates the features of this invention yield significant improvements in the run flat stability and durability of the tire. Stability means that the tire will have a stable run flat configuration so that the vehicle may be driven with the tire in its run flat condition for several miles without loss of control due to the run flat condition of the tire. Durability means that the tire will survive the run flat operation when it is carrying the vehicle load. This survival is manifest in that the tire will not be destroyed during the run flat operation and therefore yield an unstable structure with the resulting danger of loss of control of the vehicle during run flat operation.

The improvement of this invention is realized by the structural features of this invention which result in an equal distribution of the vehicle load on both sidewalls of the tire when the tire is operated in a flat condition. Most front position passenger tires when mounted on a vehicle are mounted with a camber other than zero degrees. Camber is an angulation of the tire in relation to the plane perpendicular to the road surface. It is common to have such angulation on the order of positive 0.5° to 2° as measured from this perpendicular with the angle inclined toward the ground and toward the center of the vehicle. Rear position tires may be mounted with a camber of about +0.5°. This camber angulation is necessary to vehicle geometry for all around performance under various driving circumstances.

As one looks at the front of the vehicle, this angulation results in what may be pictured as the tires being in a "pigeon-toed" relationship to the vehicle and themselves; that is, the tires will be angled so that the portion of the tire that engages the road is closer to the center of the vehicle than the portion that is 180° away from the road engaging portion.

When a tire is run flat on a vehicle, this camber angulation is increased due to the uninflated nature of the tire. This increase results in a camber of from approximately positive 2.5° to 4° in the front position when measured in reference to a perpendicular to the road surface. A positive camber is imparted to tires during run flat operation even though no initial camber exists.

This angulation of the tire during its operating conditions, which is exaggerated during its run flat condition, results in an unequal load in the sidewalls of the tire. This has been demonstrated by tests which show higher running temperatures in the sidewall on the outside side of the tire and premature failure in this sidewall of the tire as opposed to the sidewall on the inside (vehicle side) of the tire.

This disproportionate loading of the outside sidewall of the tire is eliminated by a proper combination of structural features in the tire itself and the rim upon which the tire is mounted. Specifically, the tire of this invention contains inserts of a high modulus, low hysteresis rubber compound in the sidewalls of the tire. These inserts are located on the inner periphery of the fabric reinforcement in the tire and at the midpoint of the sidewall. The insert on the side of the tire designed to be mounted on the inside of the vehicle is bulkier or heavier than the insert on the side of the tire designed to be mounted on the outside of the vehicle. This difference assists in equating the load distribution in the tire when it is run flat. The inside sidewall insert, to accomplish this result, should be substantially larger in bulk, at least 25%, than the insert on the outside sidewall. This increased bulk is measured by a comparison of the cross-section area of inserts. It may be obtained by an axially thicker insert or a radially longer insert.

The rubber compound that is utilized as the insert must have high modulus and low hysteresis properties. These rubber compounds are comprised of natural rubber along with standard compounding ingredients such as reinforcing fillers (carbon black), processing oils, antioxidants, antiozodants, vulcanization ingredients and vulcanization accelerators. The specific ingredients are well known in the art and can be altered to obtain the high modulus-low hysteresis properties that are necessary for this invention. The high modulus property of this compound means that the compound must have a modulus of elasticity as measured at 200% elongation of 1150 to 1450 psi, preferably about 1300 psi. The low hysteresis means that the compound must have a hysteresis value as indicated by running temperature measurement (lower values being better) measured on Firestone Flexometer. These values should be less than 230° F., preferably as low as possible.

The lower sidewall area of the tire may be structured to contain a portion which supports the stability of the tire-rim combination during run-flat operation. This support is attained by a portion of the lower sidewall of the tire having a substantially flat surface that extends from the bead area of the tire in a substantially axially outward direction for a distance that is approximately equal to the width of the rim flange extension. The remainder of the tire sidewall is formed in a manner so that sidewall has no flex concentration lines. This lower sidewall support member is better defined in reference to the drawings.

The location of the inserts in the tire of this invention yields a structure having a column type effect. The column effect means that the run flat tire structure is loaded along a line which bisects the tire shoulder, the sidewall insert, the support member and the rim flange extension. During run flat operation the shoulders of the tire, the sidewall inserts and members are placed into compression. The cord material in the tire, due to the presence of the inserts, remains in tension during run flat operation and does not undergo a compression-tension cycle.

In the combination of this invention, the rim upon which the tire identified above is mounted also contains features which equalize the load distribution on the tire sidewalls. The rim comprises an annular drop center area with annular bead seats located on either side thereof which are adapted to receive the beads of the tire. Rim flanges are located on the axially outer edge of these bead seats and rim flange extensions are located on the rim flanges axially outward of the rim flanges. These extensions are in the form of annular members.

The important feature of the rim flange extensions is that they extend at an angle to a plane passing through rim flanges and parallel to the axis of rotation of the rim with the angle having a different sign depending upon the side of the rim. That is, the angle formed by the rim flange extension located on the side of the rim designed to be mounted on the outside of the vehicle is in a positive direction or, as viewing the cross-section of the rim when mounted on a vehicle from the front of the vehicle, the rim flange extension is angled upward toward the axis of rotation of the rim-tire combination (angled away from the road surface). Conversely, the rim flange extension on the side of the rim designed to be mounted on the inside of the vehicle is angled in a negative direction; that is, when viewing the cross-section of the rim when mounted on the vehicle from the front of the vehicle, the rim flange extension is angled away from the axis of rotation (angled toward the road surface).

The angle that these rim flange extensions form with the plane parallel to the axis of rotation of the rim are from 1° to 3° in the positive direction on the outside rim flange and from 1° to 3° in the negative direction on the inside rim flange. This angulation of the rim flange extensions provides a structure which will equally distribute the load of the vehicle on each tire sidewall when the tire is mounted on the vehicle in its standard configuration.

Normally, a tire is set on a vehicle in a front position so that it has a positive camber between 0.5° and 2°. This means that the tire will be tilted in at the road engaging area when viewed on a vehicle from the front of the vehicle. When the tire is run flat this positive camber is accentuated so that the angle is usually between approximately positive 2.5° and 4°. The rim of this invention with its rim flanges angled in different directions counteracts the unequal load that the camber places on the sidewall of the tire. This is accomplished by the angle change from a plus value on the outside rim flange extension to a minus value on the inside. The geometry of this and its exact relationship to the camber of the tire will be evident from a view of the drawings.

The angle of the rim flange extensions may or may not be equal. That is the positive and negative values on each side may be the same, say 2 degrees, or they may be different, positive may be 1.5 degrees, negative may be 2 degrees.

The radially outward surface of the rim flange extension will bear the weight of the tire during run-flat operation and will be in contact with the tire during this operation. Conversely, when the tire is operated under normal conditions of rated load and inflation, the rim flange extensions do not contact the tire. This means that normal ride comfort characteristics will be maintained during normal operation of the tire. During run-flat operation of the tire, due to the structural features identified above in the tire sidewalls (the asymmetric insert construction) and the asymmetric nature of the rim flange extensions' angulations, the sidewalls of the tire will be uniformly and equally loaded. This will result in a minimum of lower sidewall movement.

The radially outer surfaces of the rim flange extensions may be provided with one or a series of protrusions that extend radially outward from the surface. These protrusions mechanically engage the lower sidewall of the tire or the support member, if the tire has one in its lower sidewall, during run-flat operations and thereby prevent the tire from rotating or moving in relation to the rim during run-flat operation. This movement may be a rotation in relation to the rim or a bead unseating.

The rim of this invention may also contain an annular reservoir member located thereon. This reservoir member may be used to store a liquid cooling and/or lubricating type material that will be injected into the tire by an appropriate pressure sensitive valve when the tire is run flat. During the loss of air by a tire as it is going flat a valve which connects the exterior reservoir member to the air cavity of the tire will be actuated so that the fluid in the reservoir member will be free to move into the tire cavity. Such movement will be accomplished by the centrifugal force that is applied to the fluid in the reservoir member during normal operation and rotation of the tire. The reservoir member is located on the rim at a position radially inward of the bead seats on the exterior of the rim. The member may be attached to the rim by any standard means. This structure will become more evident from a review of the drawings.

DETAILED DESCRIPTION OF THE INVENTION

The tire-rim combination is shown as having a camber angle "a", as defined from a perpendicular, line A, to the road surface, line X, and the camber angulation line B, that intersects perpendicular X at point Y on the axis of rotation of the combination. This angulation is shown with the angle in a positive direction so that the tire-rim combination is tilted inward toward the center of the vehicle body in the road contacting area.

The rim is shown generally as 1 having an annular drop center area, 2, which has bead seats, 3, located axially outward of either side of the drop center area. The bead seats have rim flanges, 4, extending axially outward from the bead seats and the rim flanges have rim flange extensions, 5, extending axially outward from the edges thereof.

Figure 1:
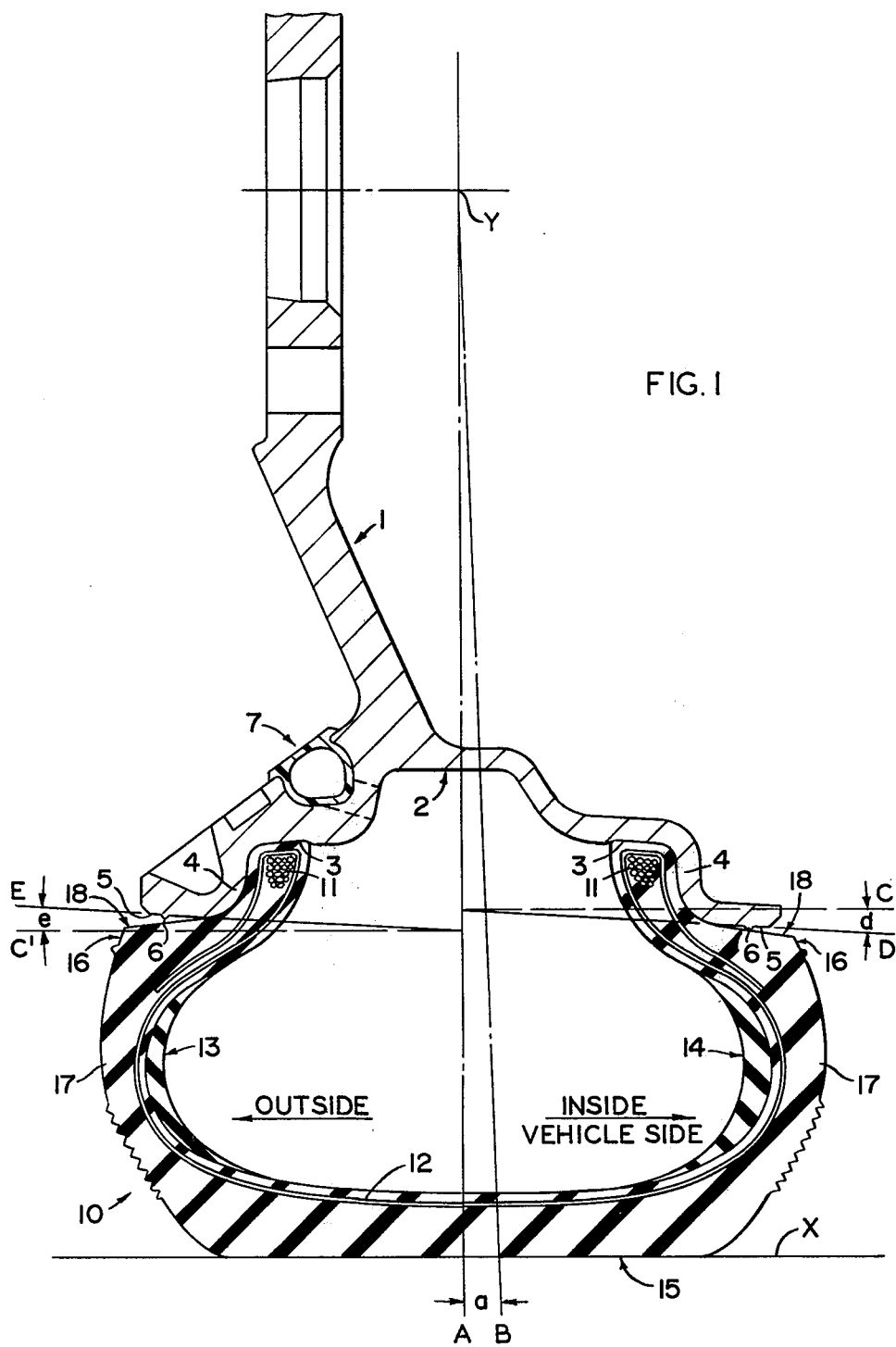
FIG. 1 is a cross-sectional view of a tire and rim exemplifying the structures of this invention when the tire is mounted on the rim, inflated to rated inflation and subject to rated load.

In the rim of this invention, the rim flange extensions form an angle to a plane parallel to the axis of rotation of the rim. Such planes are shown as broken lines C and C' in FIG. 1. In FIG. 1 the side of the combination that is designed to be mounted toward the vehicle (the inside) is the right hand side and side of the combination that is designed to be mounted away from the vehicle (the outside) is the left hand side. The rim flange extension, 5, on the vehicle side (right hand side of FIG. 1) is located at an angle "d" formed by line D in relation to line C. This angle is inclined in a direction toward the road surface or away from the axis of rotation of the tire and has negative value. The rim flange extension, 5, located on the outside of the tire (left hand side of FIG. 1) is inclined upward toward the axis of rotation of the tire or away from the road surface. This has a positive value and is depicted as the angle "e" formed by the line E in relation to line C'.

The angulation of the rim flange extension, 5, on the vehicle side of the rim (right hand side of FIG. 1) is preferably from $-1°$ to $-3°$ and on the outside side of the rim (left hand side of FIG. 1) is preferably from $+1°$ to $+3°$. The values of these angles may be equal (with opposite signs), or they may be different. The angulation value is dependent upon the construction of the tire which is designed for the rim and the amount of camber in the vehicle that the rim is designed to be mounted on. These factors may result in an angle greater than 3° and on unequal angles from one side of the rim to the other.

The angles must be balanced with the vehicle camber and the construction to yield a combination in which the tire sidewalls are approximately equally loaded under run flat conditions. This equal loading is evidenced by both rim flange extensions being parallel to the road surface and temperature data taken in the support member, mid-sidewall and shoulder area of each sidewall during run-flat operation.

The outer surface of the rim flange extension may contain protrusion, 6, which are designed to grip a portion of the tire when the tire is run flat and in contact with the rim flange extensions. In this embodiment the protrusion is an annular rib. It may be circumferentially continuous or discontinuous.

The rim may also contain an annular reservoir member, 7, which is located radially inward of the bead seats. This reservoir member is connected to the air cavity defined by the tire and rim by a pressure sensitive valve (not shown). This reservoir member may contain a cooling and/or a lubricant fluid that is displaced into the air cavity when the air pressure in the air cavity goes below a certain level thereby actuating the valve. The fluid is displaced into the air cavity by centrifugal force that occurs during the revolution of the rim-tire assembly.

The tire is shown generally as 10, having annular road engaging tread surface, 15, that is connected to sidewalls 17, at its lateral edges. The sidewalls terminate in annular bead bundles, 11, in the bead area of the tire. Reinforcing carcass plies, 12, extend from one bead bundle to the other through the sidewalls and the tread area of the tire. The inner periphery of the sidewalls of the tire contain inserts 13 and 14.

The inserts are located inwardly of the carcass reinforcing material or plies. The inserts are located at the midpoint of the sidewall; that is, the distance half way between the bead seat and the road engaging tread surface when the tire is mounted and inflated under normal conditions. The insert, 14, on the side of the tire designed to be mounted toward the vehicle, is thicker in cross-section and is, therefore, bulkier than the insert, 13, on the side of the tire designed to be mounted on the outside of the vehicle. This difference in bulk compensates for the unequal loading that will occur when the tire is mounted on the rim under run flat conditions. This asymmetric nature of the insert in the tire sidewalls combats this disproportionate loading condition.

The asymmetric nature of the angulation of the rim flange extensions described above also combats this condition. The combination of these two asymmetric conditions yields the best balance of loading on the sidewalls although the condition in the tire or the rim, by itself, combats a portion of the disproportionate loading.

The tire also contains support members, 16, located in the lower sidewall areas. These members contain a surface, 18, that is adapted to correspond to the ride upon the rim flange extensions when the tire is run flat. During normal operation of the tire under normal conditions of inflation and load, the support members of the tire, 16, will not be in contact with the rim flange extensions.

The radially inward, approximately flat surface, 18, of the support member is substantially parallel to the axis of rotation of the tire. This flat surface, 18, may also have an axial length approximately equal to the axial width of the rim flange extension.

Figure 2:
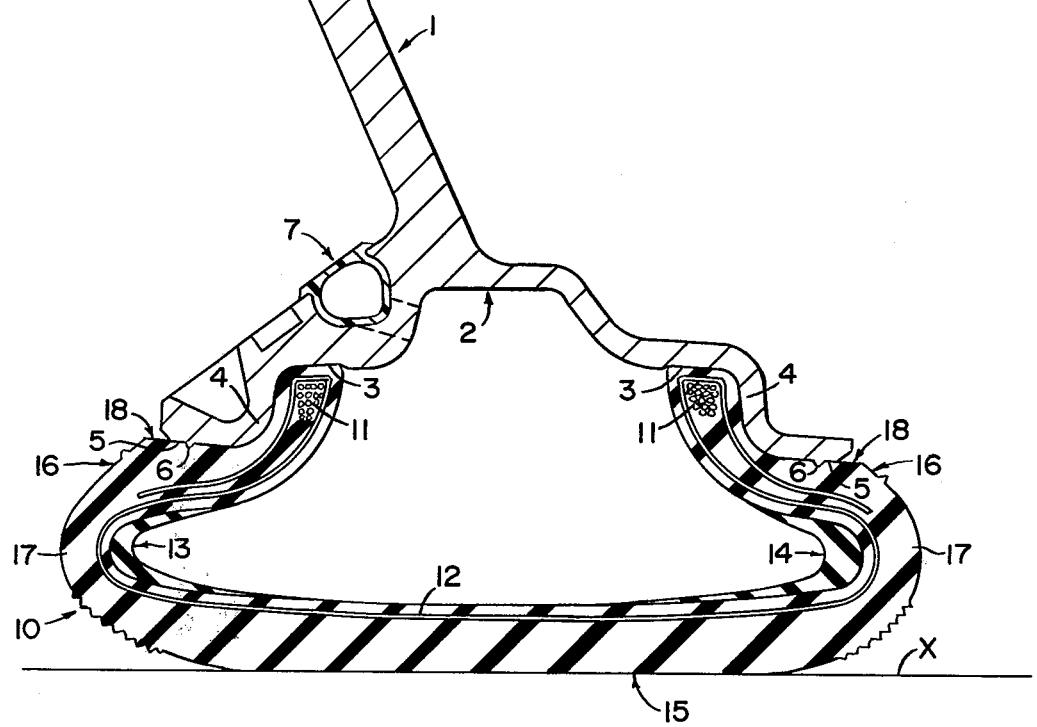
FIG. 2 is a cross-section of the tire of FIG. 1 wherein the tire is under load and with no inflation pressure; that is, its run flat configuration.

FIG. 2 depicts the tire and rim of FIG. 1 when the inflation pressure in the tire has been lost and the tire is bearing the vehicle load. This is known as the run flat condition of the tire. The asymmetric nature of the sidewall inserts and the asymmetric nature of the angulation of the rim flange extensions results in an equal distribution of the vehicle load on both of the sidewalls. The presence of the inserts additionally maintains the tire reinforcing body, 12, in tension and does not permit this body to go into a tension-compression cycle. The load supporting structure as shown in the FIG. 2 is a dual column type wherein each shoulder area of the tread, each sidewall insert, each tire support member and each rim flange extension for one column to support the weight of the vehicle.

The reservoir member, 7, is preferably a reinforced plastic tube which is either fastened or snapped into place on the external surface of the rim. The location of this tube outside of the tire cavity defined by the rim and tire facilitates easy mounting of the reservoir member and the tire. Replacement of the reservoir member and refilling of the reservoir member is also easier with this location. The reservoir member may also be considered a heat sink to draw heat away from the carcass of the tire during normal operation.

The reservoir member preferably contains a cooling and/or a lubricant liquid. This liquid can be any of the known types already taught for internal lubrication of tires when run flat or a material that acts as a coolant to yield a flat tire that has a lower running temperature.

A 185/65R14 steel belted radial tire was manufactured in accordance with this invention and mounted on a 14 inch diameter rim that was modified to conform with the rim structure of this invention. The rim width as measured from one bead seat to the other was 4.5 inches and the rim flange extension extended 1.1 inches beyond the bead seat. The angulation of the rim flange extensions was 2°; that is, a −2° on the vehicle side and a +2° on the outside. Each outer surface of the rim flange extensions contained a circumferential rib for bead retention.

The tire had one body ply of 840/2/3 nylon fabric the cords of which extended in a radial direction; two tread plies of steel cords, wire bead bundles and a road engaging tread surface. The tire contained a support member in the lower sidewall areas whose radially inward surface was adapted to correspond to the outer surface of the rim flange extensions. The section height of the tire was 5 inches and the section width was 7.5 inches.

The tire contained inserts at the mid-sidewall area located inside the reinforcing body ply. The insert in the vehicle side was 0.25 inches thick whereas the insert in the outside was 0.20 inches thick. The modulus of the rubber compound utilized in the inserts was 1300 psi at 200% elongation and the running temperature (hysteresis) of the rubber compound was between 190° F. and 230° F.

Tires of this construction were tested on a series of tests to determine the stability of this construction when the tire was run under normal conditions and run flat and the durability of the tire when the tire was run flat. Tires of this construction were compared to tires with inserts that were evenly balanced from one sidewall to the other and were at different locations in the sidewall. These control tires were run on a regular rim and on a rim with extended rim flanges. The results of run flat tests on these three combinations are set out in the table below. It is evident from these tests that the combination of the asymmetric sidewall tire with the asymmetric rim flange extensions yields a structure that performs in an improved manner.

| Feature | Run-flat mileage to failure (50 mph) Average two tires | Maximum Sidewall Temperatures °F. Outside | Vehicle Side | Mileage |
|---|---|---|---|---|
| Control Tire Regular Rim | 10.3 | 325 | 307 | 10 |
| Control tire Extended flange rim | 13.9 | 374 | 318 | 15 |
| Asymmetric Tire Extended flange rim | 50* | 301 | 295 | 30 |

*Removed, no failure

It is understood that this invention is particularly suited for passenger vehicle tires although it may also be applied to truck and airplane tires where the tire is operated under an initial camber or operates under a camber condition when the tire is run flat. The features of the tire not discussed may be any of the standard features manufactured using standard materials by standard method. For example, the reinforcing body may contain cords of nylon, rayon, or aramid; the tread ply belt may contain cords of aramid, glass or steel.

I claim:

1. In combination, a pneumatic tire and rim wherein said tire comprises an annular road-engaging tread surface, sidewalls connecting the lateral edges of said tread surface to annular beads and reinforcing plies connecting said beads and passing through said sidewalls and radially inward of said tread surface, said rim comprising an annular drop center area having bead seats extending axially outward from each lateral edge thereof, rim flanges located axially outward of each said bead seat and rim flange extensions extending axially outward from each rim flange, the improvement comprising an asymmetric sidewall construction in said tire wherein each said sidewall has an insert of high modulus, low hysteresis rubber compound located on its inner periphery, the insert on the sidewall designed to be mounted on the inside of the vehicle having a greater bulk than the corresponding insert on the sidewall designed to be mounted on the outside of the vehicle, said rim flange extensions forming angles, as measured from a plane parallel to the axis of rotation of said rim, wherein said angle has a negative value on the side of the rim designed to be mounted on the inside of the vehicle and a positive value on the side of the rim designed to be mounted on the outside of the vehicle, whereby when the tire is run flat said rim flange extensions are both parallel to the road surface and each sidewall is equally loaded.

2. The combination of claim 1 wherein said vehicle said insert has approximately 25% greater bulk than said corresponding outside insert.

3. The combination of claim 1 wherein said negative value of said vehicle side rim flange extension is between $-1°$ and $-3°$ and said positive value of said outside rim flange extension is between $+1°$ and $+3°$.

4. The combination of claim 1 wherein the outer surface of said rim flange extension has a protrusion to engage the tire sidewall when the tire is run flat.

5. The combination of claim 1 wherein said tire has a support member in its lower sidewall areas, said support member having a radially inward, flat surface that is substantially parallel to the axis of rotation of said combination.

6. The combination of claim 5 wherein said flat surface of said support member has an axial length approximately equal to the axial width of said rim flange extension.

7. The combination of claim 1 wherein said rim has reservoir member located thereon radially inward of said bead seats, said reservoir member containing a liquid and connected to the air chamber defined by said tire and rim by a value.

8. A rim for a pneumatic tire comprising an annular drop center area having bead seats extending axially outward from each lateral edge thereof, rim flanges located axially outward of each said bead seat and rim flange extensions extending axially outward from each rim flange, the improvement comprising said rim flange extension on the side of the rim designed to be mounted on the inside of the vehicle forming a negative angle as measured from a plane parallel to the axis of rotation of said rim and the rim flange extension on the side of the rim designed to be mounted on the outside of the vehicle forming a positive angle to said plane whereby said rim flange extensions are parallel to the road surface during run-flat operation of said rim when the tire mounted thereon is deflated.

9. The rim of claim 8 wherein said negative and said positive angles are equal in size.

10. The rim of claim 8 wherein said negative and said positive angles are unequal in size.

11. The rim of claim 8 wherein said negative angle is between $-1°$ and $-3°$ and said positive angle is between $+1°$ and $+3°$.

12. The rim of claim 8 wherein the outer surface of said rim flange extensions has a protrusion to engage the tire sidewall during run-flat operation and prevent slippage of said tire in relation to said rim flange extension and said rim bead seat.

13. The rim of claim 8 having a reservoir member mounted thereon radially inward of said bead seats.

14. A pneumatic tire comprising an annular road-engaging tread surface, sidewalls connecting the lateral edges of tread surface to annular beads and reinforcing plies extending from one bead to the other passing through said sidewalls and radially inward of said tread surface, the improvement comprising an asymmetric sidewall construction wherein each sidewall has an insert of high modulus, low hysteresis rubber compound located on its inner periphery, the insert on the sidewall designed to be mounted on the inside of the vehicle having a greater thickness than the insert on the sidewall designed to be mounted on the outside of the vehicle so that said tire, when mounted on a rim and a vehicle compensates for the camber imparted to said tire by said mounting and said sidewalls are equally loaded during run-flat operation of said tire.

15. The tire of claim 14 wherein said vehicle side insert has approximately 25% greater bulk than said outside insert.

16. The tire of claim 14 said sidewalls have support members in the lower sidewall area, said support members having a radially inward, flat surface that is substantially parallel to the axis of rotation of said tire.

17. The tire of claim 16 wherein said flat surface of said support member has an axial length approximately equal to the axial width of the rim flange extension of the rim upon which it is designed to be mounted.

* * * * *

UNITED STATES PATENT AND TRADEMARK OFFICE
CERTIFICATE OF CORRECTION

PATENT NO. : 4,203,481
DATED : May 20, 1980
INVENTOR(S) : William J. Ranik, Jr.

It is certified that error appears in the above-identified patent and that said Letters Patent are hereby corrected as shown below:

Column 1, line 36 "Pat. No. 3,930,527 should read --Pat No. 3,935,327--;

Column 1, line 53 "then" should read --the--;

Column 6, line 58, "the" should read -- and --.

Column 9, Claim 2, line 4 "said" should read --side--.

Signed and Sealed this

Thirtieth Day of September 1980

[SEAL]

Attest:

SIDNEY A. DIAMOND

Attesting Officer

Commissioner of Patents and Trademarks